Figure 1:
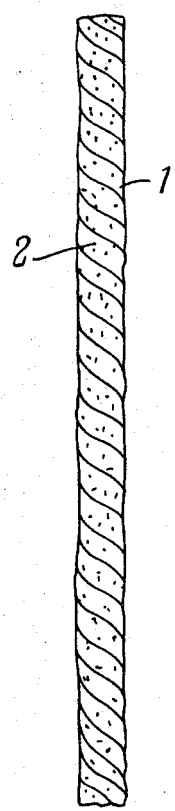

United States Patent [19]
Murphy

[11] 3,756,388
[45] Sept. 4, 1973

[54] RESINOUS CARTRIDGES FOR SECURING FIXING ELEMENTS
[75] Inventor: John Michael Murphy, Derbyshire, England
[73] Assignee: Explosives and Chemical Products Limited, London, England
[22] Filed: Jan. 25, 1971
[21] Appl. No.: 109,471

[52] U.S. Cl. .................. 206/47 A, 61/45 B, 206/84
[51] Int. Cl. ............................................ B65d 81/32
[58] Field of Search ........................... 206/47 A, 84; 61/45 B

[56] References Cited
UNITED STATES PATENTS
3,111,569 11/1963 Rubenstein ...................... 206/47 A
3,324,663 6/1967 McLean ............................ 206/47 A FOREIGN PATENTS OR APPLICATIONS
1,423,023 11/1965 France .............................. 206/47 A Primary Examiner—William T. Dixson, Jr.
Attorney—Cushman, Darby & Cushman

[57] ABSTRACT

For use in the production of resinous cartridges for securing fixing elements, a hardener component comprising a carrier material having disposed thereon and/or therein a hardener composition containing a hardener for the thermosetting resin present in the resinous cartridge.

12 Claims, 2 Drawing Figures

PATENTED SEP 4 1973  3,756,388

RESINOUS CARTRIDGES FOR SECURING FIXING ELEMENTS

This invention relates to resinous cartridges of the kind which may be employed in the securing of fixing elements such as anchor bolts in oversized bore holes adapted to receive the fixing elements. Such cartridges are commonly employed in the securing of roof bolts in mines, tunnels and the like.

One method of producing such resinous cartridges involves injecting simultaneously into a length of frangible tubing a pasty resin composition and a pasty hardener composition by means of twin feed extruding machine so that a layer of resin composition and a layer of hardener composition are disposed lengthwise in the tubing and in contact with each other.

Whilst the aforementioned semi-continuous method has been found to be suitable for producing relatively large diameter cartridges, for instance cartridge diameters of 1 inch or more, it has been found that the production of smaller diameter cartridges gives rise to mechanical difficulties in controlling the extrusion rates of the resin and hardener compositions through the relatively small injection nozzles which are required, such control being necessary in order to obtain the desired weight ratio of resin to hardener in the cartridge.

It has now been found, in accordance with the present invention, that such mechanical difficulties may be obviated if the hardener composition is disposed on or in a longitudinally extending carrier material, for example a textile yarn. In this manner the hardener composition can be fed into the frangible tubing concomitantly with the extruded resin composition in a semi-continuous manner as in the aforementioned earlier method, whilst also making it much easier to ensure that the correct weight ratio of resin to hardener is maintained, since even if the extrusion rate of the resin composition through its nozzle fluctuates, the required weight ratio can be achieved merely by ensuring that a fixed amount of resin composition is fed into the cartridge casing, for example by ensuring that the casing is filled and that the casing contains the hardener-containing carrier material throughout its length.

Thus in accordance with one aspect of the invention there is provided a hardener component suitable for use in the production of resinous cartridges containing a resin in association with a polymerizable monomer solvent, the hardener component comprising a longitudinally extending carrier material having substantially uniformly distributed thereon and/or therein a hardener composition comprising an organic peroxide, an organic plasticiser and optionally one or more inorganic fillers.

Figure 2:
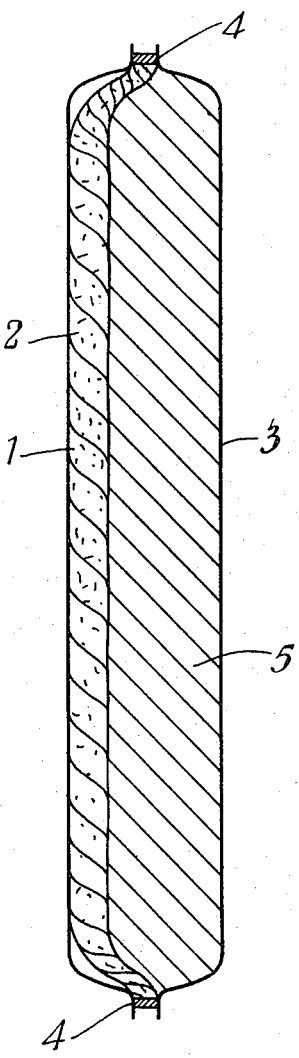

In the drawings:

FIG. 1 is a side view of a hardener component in accordance with the invention; and FIG. 2 is a longitudinal sectional view of a resinous cartridge produced with the hardener component of FIG. 1.

The carrier material can be a textile yarn advantageously formed from a plurality of continuous filaments or strands each of which has been coated with the hardener composition, preferably in the form of a paste. The textile yarn may be composed of filaments or strands of, for example, sisal, hemp, glass, asbestos or twisted tissue paper. Asbestos string is preferably used as the textile yarn. Alternatively the carrier material may be a foamed plastics strip, for example a polyurethane foam strip, a twisted plastics netting or a twisted woven glass fibre tape.

The organic peroxide employed in the hardener composition is preferably an acyl peroxide, for example benzoyl peroxide or 2:4-dichlorobenzoyl peroxide, although other peroxides such as ketone peroxides, for example methyl ethyl ketone peroxide or cyclohexanone peroxide, may be used, the choice of peroxide depending of course on the type of resin to be used in the resinous cartridge. The organic plasticiser may be, for example, a diester of phthalic or adipic acid, a chlorinated paraffinic hydrocarbon or an organic phosphate. The inorganic filler or fillers may be chosen from, for example, silica, dolomite, calcite, talc, gypsum and slate powder.

In a preferred embodiment, a hardener-containing textile yarn is produced by untwisting the yarn into its component strands or filaments, passing these through a bath containing a paste formed from the organic peroxide, organic plasticiser and inorganic filler(s) so as to coat the strands or filaments therewith, and thereafter re-twisting the coated strands or filaments to form the required textile yarn.

In accordance with a second aspect of the invention there is provided a method of producing resinous cartridges suitable for use in the securing of fixing elements, which method comprises feeding into a length of frangible tubing (a) a hardener component comprising a longitudinally extending carrier material having substantially uniformly distributed therein and/or thereon a hardener composition comprising an organic peroxide, and organic plasticiser and optionally one or more inorganic fillers, concomitantly with (b) a resin composition comprising an unsaturated polyester resin and a polymerizable monomer solvent in admixture with one or more inorganic fillers therefor, in a manner such that a layer of the resin composition and the hardener component extend lengthwise inside the frangible tubing in contact with each other, and forming from the resulting filled tubing one or more of the required resinous cartridges.

The unsaturated polyester resin used in the resin composition is one formed by esterifying one or more dihydric alcohols, for example ethylene glycol, propylene glycol, butylene glycol or diethylene glycol, with an ethylenically unsaturated dicarboxylic acid or anhydride, for example maleic, fumaric or itaconic acid, and optionally also with the dicarboxylic acid or anhydride containing no ethylenic unsaturation, for example o-phthalic, isophthalic or adipic acid. Such unsaturated polyester resins are commercially available as solutions in an unsaturated organic solvent which is normally a polymerizable monomer such as, for example, styrene. Examples of such commercially available resin solutions are those manufactured by Farbenfabriken Bayer A.G. and sold in the United Kingdom under the registered Trade Mark "Leguval." These solutions normally contain from 50 to 80 percent by weight of the unsaturated polyester resin and are normally stablised against premature gelation by minute additions of stabilisers such as, for example, hydroquinone or tert-butyl catechol.

The curing of these unsaturated polyester resins which in use is catalysed by the hardener contained in the carrier material can advantageously be effected at ambient temperatures (i.e., cold curing) if an accelerator is present. The accelerator, for example a tertiary amine such as dimethyl aniline, or a transition metal such as cobalt, vanadium or a rare earth metal, preferably in the form of a maphthenate or octoate thereof, may be present in the resin composition, for example mixed with the polyester resin. Alternatively there may be used a polyester resin in which the amine accelerator forms an integral part of the resin molecule. These resins may be prepared by an esterification reaction similar to that hereinbefore described but in which a small proportion of the dihydric alcohol, for example from 2 to 8 percent, is replaced by an amine having reactive hydroxyl groups, for example thiethanolamine. Such modified resins are also commercially available products, for example the K grades of the aforementioned Leguval resins. These resins can be cured at ambient temperatures by an acyl peroxide hardener, for example benzoyl peroxide, and possess the advantage of enhanced shelf-life. The unsaturated polyester resin may be present in the composition in an amount of, for example, from 10 to 35 percent by weight of the composition.

The polymerizable monomer present in the resin composition is an ethylenically unsaturated monomer, preferably styrene. Other polymerizable monomers which may be used include, for example, the mono- and di-esters of maleic, fumaric and itaconic acids, vinyl esters such as vinyl caprate and vinyl stearate, and allyl compounds such as tetra-allyl sorbitol and di-allyl phthalate. The polymerizable monomer may be the same as, or different from, that in which the unsaturated polyester is initially dissolved. If the polymerizable monomer solvent is present in sufficient amount, it is of course not essential to include additional polymerizable monomer.

The frangible tubing which forms the casing for each individual resinous cartridge may be formed from any suitable material which when compressed by a rotating head of a fixing element in an oversized bore hole will break or split or tear so as to allow the rotating head to mix the resin composition with the hardener therefor and hence cause the unsaturated polyester resin and polymerizable monomer to react and thereby cause curing of the resin. Suitable materials include synthetic thermoplastics materials, such as polyamides, laminates of polyamide or polyethylene films with the polyethylene, and polyester films; callulose acetate, paper and fibrous material such as that used for making synthetic sausage skins.

It will be appreciated that whilst the hardener component of the present invention is particularly useful in the manufacture of resinous cartridges in which the resin composition and hardener composition are disposed in contact with each other in a single cartridge casing, it may also be employed in the production of multiple compartment resinous cartridges in which the resin composition and hardener composition are disposed in separate capsules so as to prevent contact between the two compositions until the cartridge is used.

The following examples illustrate the invention.

EXAMPLE 1

Asbestos string consisting of four strands each of approximately 1.5 mm. diameter, was destranded, passed through a bath of peroxide hardener paste and retwisted to form a coated string of diameter 4 mm. Such a hardener component is illustrated in FIG. 1 wherein the asbestos string is shown at 1 and the peroxide hardener paste is shown at 2.

The composition of the peroxide hardener paste was as follows:

| | |
|---|---|
| Benzoyl peroxide (as 70% by weight paste in dimethyl phthalate) | 71.5% by weight |
| Chlorinated paraffinic hydrocarbon (42% Cl) | 28.5% by weight |

The string was wound on to a small reel and subsequently fed into 22 mm. diameter tubing of polyamide film simultaneously with a polyester resin composition formed from:

| | |
|---|---|
| Polyester resin (70% by weight solution in styrene monomer) | 27.0% by weight |
| Dimethyl aniline | 0.1% by weight |
| Calcite (85% smaller than 200 mesh) | 72.9% by weight |

The polyester resin employed in the foregoing composition was the product formed by esterifying 2.2 moles of propylene glycol with 1.0 mole of phthalic anhydride and 1.0 mole of maleic anhydride. After esterification to an acid value of 35 at a temperature rising to 190°C. the reaction mixture was cooled to 130°C. and then thinned with styrene monomer containing 0.03 percent by weight of hydroquinone stabiliser.

A 10 m. length of tubing closed at one end was filled and then formed into individual cartridges using a commercially available sausage clipping machine. In operation, a length of the filled tubing sufficient for one cartridge is passed through the head of the clipping machine and then a manually actuated, cam-operated, mechanism presses on the adjacent length of tubing to displace the resin composition and compress the tubing tightly around the catalyst string for a length of approximately 1.5 inches. The automatic clipping head then descends and simultaneously closes two metal clips approximately 0.75 inches apart around the compressed tubing. The filled tubing is then advanced through the clipping head for a length sufficient for a second cartridge and the compression and clipping action repeated. In this manner the length of filled tubing is converted into a "string" of cartridges which can be separated by cutting the tubing between successive pairs of metal clips. One such cartridge is illustrated in FIG. 2 wherein the tube is shown at 3, the metal clips at 4 and the polyester resin at 5.

Two of the cartridges produced in the foregoing manner were placed in a 28 mm. diameter hole bored in sandstone rock and 19 mm. diameter reinforcing bar was pushed into the hole while rotating at 500 rpm. The mixing of the cartridge components thus obtained caused gelation of the resin in 3 minutes, and direct tensile load was applied to the bolt after 15 minutes. The bolt sheared at a load of 16 tons without apparent movement of the resin anchor in the bore hole.

EXAMPLE 2

A 20 strand asbestos string was untwined, passed through a bath of peroxide hardener paste and retwisted to form string of diameter 7.5 mm.

The hardener paste was formed from:

| | |
|---|---|
| Benzoyl peroxide (as 70% by weight paste in dimethyl phthalate) | 43% by weight |
| Chlorinated paraffinic hydrocarbon (65% Cl) | 30% by weight |
| Calcite (300 mesh) | 27% by weight |

The coated string was used to prepare resinous cartridges in the manner described in Example 1 and these were tested by the same method. Gelation occurred in 1½ minutes and the bolt failed on direct pull test load as described in Example 1.

A second test with these cartridges in which a bolt was inserted into a 28 mm. diameter plastic tube, indicated similar gelation time and subsequent inspection of the cured resin plug indicated thorough dispersion of the hardener string throughout the resin mass.

EXAMPLE 3

Five strands of unpolished sisal string, each of approximately 2 mm. diameter, were passed through a peroxide hardener paste formed from:

| | |
|---|---|
| Benzoyl peroxide (70% by weight paste in dimethyl phthalate) | 43% by weight |
| Dibutyl phthalate | 23% by weight |
| Calcite (300 mesh) | 34% by weight |

The coated strands were twisted to form a composite string of 7.5 mm. diameter.

This string was used to prepare cartridges in the manner described in Example 1 and these were tested in the same fashion by application in sandstone rock. The bolt was just set in 2 minutes and was pull tested after 35 minutes. The bolt fractured at a load of 17 tons without detectable movement of the anchor.

When tested in a plastic tube, the capsules gelled in a similar time but inspection of the cured resin plug revealed that a large proportion of the catalyst string had been pushed to the end of the tube and the dispersion throughout the resin mass was inferior to that of the string based on asbestos fibre.

EXAMPLE 4

High density polyethylene netting of thickness 40 microns and mesh size 1 mm. was passed through a bath of the peroxide hardener paste of Example 3, surplus paste being removed with a scraper blade. Three strips of the coated netting, each 135 mm. in width, were twisted together to form a composite string of 11 mm. diameter.

The composite string was wound on to a small reel and subsequently fed into 32 mm. diameter polyester film tubing simultaneously with a polyester resin composition formed from:

| | |
|---|---|
| Leguval K25 R | 30.9% by weight |
| Calcite (85% smaller than 200 mesh) | 69.5% by weight |
| Aerosil 200 | 0.5% by weight |

Leguval K25 R is a commercially available 70 percent by weight solution in styrene monomer of a cold curing unsaturated polyester resin containing an internal amine accelerator manufactured by Farbenfabriken Bayer A.G. Aerosil 200 is a commercially available finely-divided pyrogenic silica manufactured by Degussa A.G.

Cartridges, each 450 g. in weight, were then produced by the method described in Example 1.

One of the cartridges so produced was placed in a 35 mm. diameter hole bored in concrete of 5,000 psi compressive strength. A 19 mm. diameter high tensile steel bolt having a forged paddle end of maximum diameter 31 mm. was inserted while rotating at 500 rpm. The resulting mixed resin plug in the hole gelled in 4 minutes and a direct tensile load was applied after 25 minutes. The bolt fractured at a load of 22 tons without apparent disturbance of the resin anchor.

EXAMPLE 5

Woven glass fibre mat approximately 60 microns thick was impregnated with the peroxide hardener paste of Example 3, surplus material being removed with a scraper blade. Two tapes were formed from the impregnated mat, each approximately 150 mm. in width, and were twisted together to form a composite string of diameter 10 mm.

The string was wound on to a small reel and subsequently fed into a 28 mm. diameter polyester film tubing simultaneously with a polyester resin composition formed from:

| | |
|---|---|
| Polyester resin (70% by weight solution in styrene monomer) | 32.0% by weight |
| Diethyl aniline | 0.15% by weight |
| Calcite (85% smaller than 200 mesh) | 67.35% by weight |
| Aerosil 200 | 0.5% by weight |

The polyester resin employed in the foregoing composition was the product formed by esterifying 1.5 moles of propylene glycol and 0.5 mole of diethylene glycol with 1.0 mole of fumaric acid and 1.0 mole of phthalic anhydride. After esterification to an acid value of 37 at a temperature rising to 200°C., the reaction mixture was cooled to 130°C. and then thinned with styrene monomer containing 0.05 percent by weight of hdyroquinone stabiliser.

Cartridges each weighing 300 g. were then produced by the method described in Example 1. One of the 28 mm. diameter cartridges so produced was placed in a 32 mm. diameter hole bored in carboniferous limestone. A 25 mm. diameter high tensile steel bolt having a rolled thread formed for 150 mm. from the tip was inserted while rotating at 500 rpm. The resulting mixed resin mass gelled in 90 seconds and a tensile test load was applied after 20 minutes. The bolt fractured at an applied load of 42 tons.

I claim:

1. A stable single unit resinous cartridge for securing elements to formations upon agitation comprising:
   a. a frangible elongated casing;
   b. a hardener-containing carrier material extending longitudinally therein ;
   c. a resin forming composition paralleling said hardener-containing carrier material in said casing; and
   d. components (b) and (c) separated by a thin interface layer of a cured resin.

2. A resinous cartridge suitable for use in the securing of fixing elements in oversized boreholes, comprising a frangible longitudinally extending casing having disposed lengthwise therein:
   a. a resin composition comprising an unsaturated polyester resin and a polymerizable monomer solvent in admixture with an inorganic filler therefor, and
   b. a hardener component comprising a longitudinally extending length of carrier material having substantially uniformly associated therewith a hardener composition comprising an organic peroxide, an organic plasticizer and optionally an inorganic filler, the resin composition and the hardener component being in direct physical contact with each other along substantially the entire physical length of the cartridge with the consequent formation at the interface between the resin composition and hardener component of a thin layer of cured polyester resin which prevents reaction between the polymerizable monomer solvent and the unsaturated polyester resin both present in the resin composition until in use the contents of the frangible cartridge are thoroughly mixed.

3. A cartridge as claimed in claim 2, wherein the carrier material is a textile yarn.

4. A cartridge as claimed in claim 3, wherein the textile yarn is formed from a plurality of continuous filaments or strands each of which is coated with the hardener composition.

5. A cartridge as claimed in claim 3, wherein the textile yarn is composed of filaments or strands of sisal, hemp, glass, asbestor or twisted tissue paper.

6. A cartridge as claimed in claim 5, wherein the textile yarn is asbestos string.

7. A cartridge as claimed in claim 2, wherein the carrier material is selected from foamed plastics strip, twisted plastics netting and twisted woven glass fibre tape.

8. A cartridge as claimed in claim 2, wherein the organic peroxide is an acyl peroxide.

9. A cartridge as claimed in claim 8, wherein the acyl peroxide is benzoyl peroxide.

10. A cartridge as claimed in claim 2, wherein the organic plasticizer is selected from chlorinated paraffinic hydrocarbons, diesters of phthalic and adipic acid, and organic phosphates.

11. A cartridge as claimed in claim 1, wherein the cured polyester resin is formed in-situ.

12. A method of producing resinous cartridges suitable for use in the securing of fixing elements in oversized boreholes, which method comprises feeding into a length of frangible tubing;

a. a hardener component comprising a longitudinally extending length of carrier material having substantially uniformly associated therewith a hardener composition comprising an organic peroxide, an organic plasticizer and optionally an inorganic filler, concomitantly with;

b. a resin composition comprising an unsaturated polyester resin and a polymerizable monomer solvent in admixture with an inorganic filler therefor, in a manner such that a layer of the resin composition and the hardener component extend lengthwise inside the frangible tubing in contact with each other, and forming from the resulting filled tubing the resinous cartridges.

* * * * *

UNITED STATES PATENT OFFICE
CERTIFICATE OF CORRECTION

Patent No. 3,756,388   Dated September 4, 1973

Inventor(s) John Michael Murphy

It is certified that error appears in the above-identified patent and that said Letters Patent are hereby corrected as shown below:

In the heading:

Please add:

-- [30] Foreign Application Priority Data

January 30, 1970   Great Britain......4706/70

Signed and sealed this 14th day of January 1975.

(SEAL)
Attest:

McCOY M. GIBSON JR.
Attesting Officer

C. MARSHALL DANN
Commissioner of Patents